Nov. 15, 1966   P. PERISSE   3,285,469
SAFETY PRESSURE-REDUCING DEVICE FOR GAS CYLINDERS
UNDER PRESSURE AND ITS APPLICATION
TO A SPRAY APPARATUS
Filed Oct. 26, 1964   4 Sheets-Sheet 4
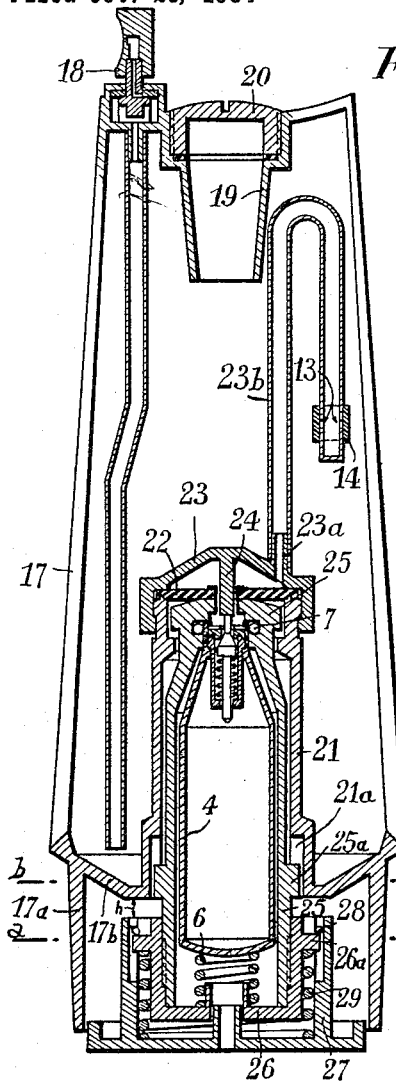
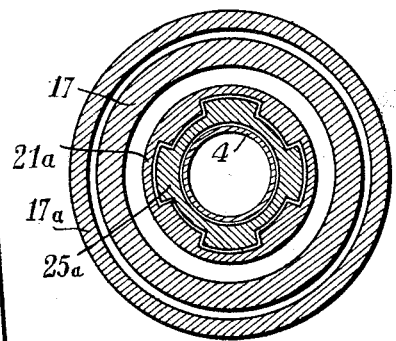
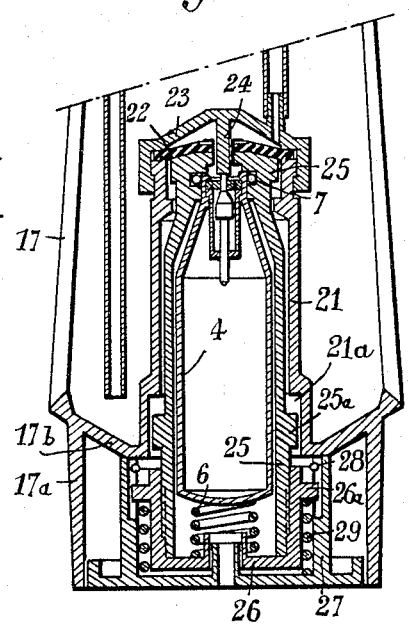
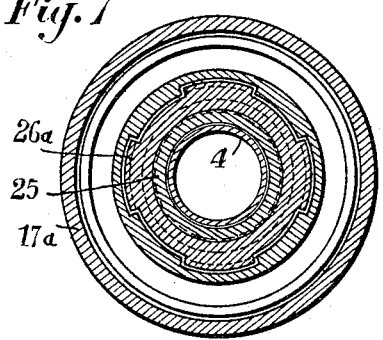

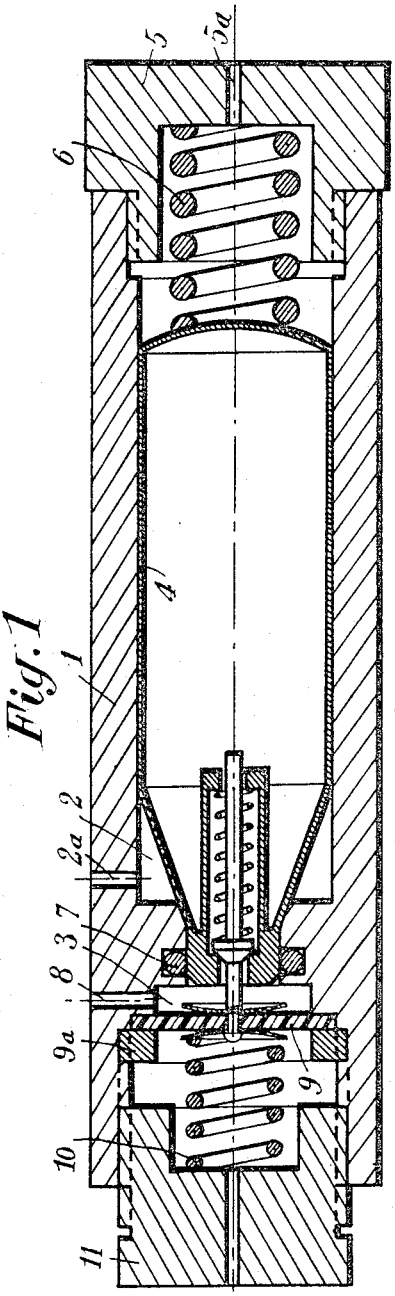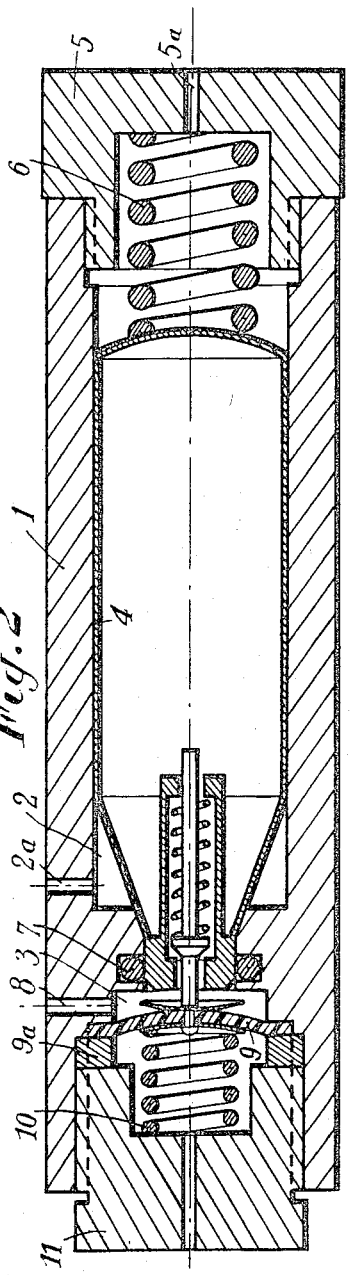

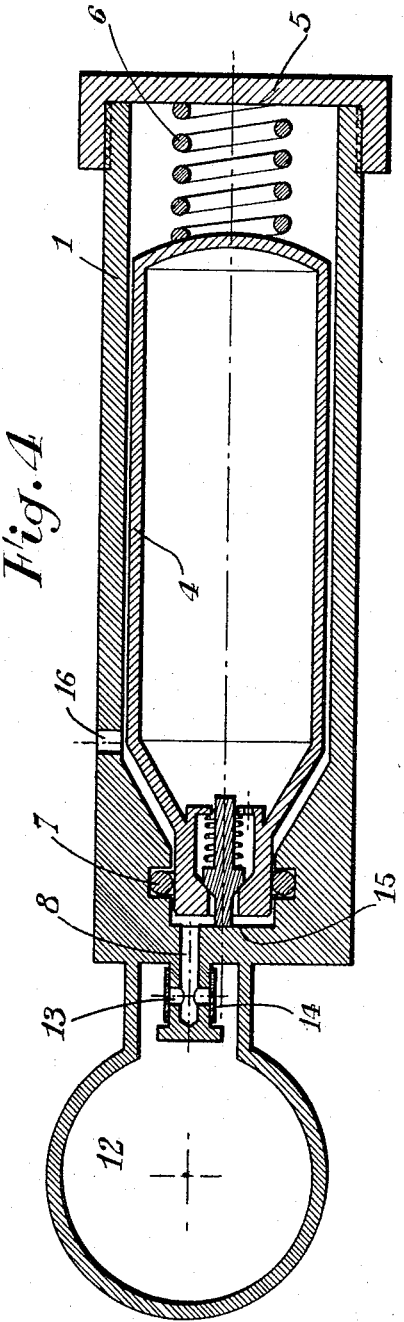
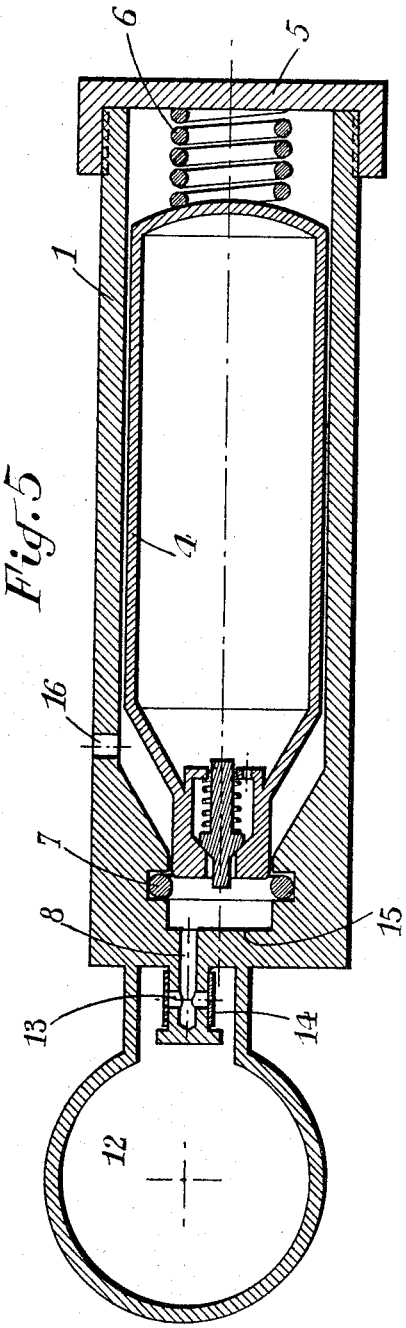

United States Patent Office 3,285,469
Patented Nov. 15, 1966

3,285,469
SAFETY PRESSURE-REDUCING DEVICE FOR GAS CYLINDERS UNDER PRESSURE AND ITS APPLICATION TO A SPRAY APPARATUS
Pierre Perisse, Rieumes, Haute-Garonne, France
Filed Oct. 26, 1964, Ser. No. 406,620
Claims priority, application France, Oct. 26, 1963, 951,922, Patent 1,390,963; Feb. 26, 1964, 965,214, Patent 85,290; Mar. 25, 1964, 968,712, Patent 85,712
3 Claims. (Cl. 222—3)

Cylinders or cartridges of gas under pressure can be utilized as sources of high pressure in apparatus which only requires the use of a relatively low pressure of gas.

In this type of apparatus, the gas contained in the cylinder is admitted to a chamber of the utilizing apparatus, and a pressure-reducing device cuts-off the flow from the cylinder when the pressure in the chamber reaches the utilization value.

The manufacture of this type of apparatus has however a drawback which is quite often prohibitive by reason of its consequences on the production cost price: the gas utilization chamber must in fact have a strength much greater than that which would be permissible for the utilization pressure which should normally exist in it. This precaution, essential to avoid any risk of bursting of the apparatus, is explained by the fact that the closure valves of gas cylinders under pressure, whatever may be the quality of their manufacture, always have some leakage which may be due to ageing, to deposits of dust on the seating of the valve, to oxidation, etc.

These leakages, however small they may be, may, if the apparatus remains unused for a long time, bring the pressure in the chamber of the utilizing apparatus up to its value of equilibrium with the source of high pressure. It is obvious that this equilibrium value may be sufficiently high to cause bursting of the apparatus if the chamber is not very much stronger than would be required by normal conditions of use.

The present invention has for an object to provide a safety device associated with pressure-reducing valves for gas cylinders under pressure, which eliminates radically the drawback referred to above.

The device according to the invention is essentially characterized in that members ensuring fluid-tightness between the utilizing apparatus and the ferrule of the cylinder permit a sliding movement of this latter, which is furthermore acted on by a suitably calibrated spring, so that when the force of the spring is exceeded by the force applied on the head of the cylinder by the pressure existing in the receiving apparatus, a backward movement of the cylinder takes place, which causes a leakage limiting the pressure of the gas contained in the receiving apparatus to the safety pressure.

The invention has a further object to provide a pressure-reducing device associated with the safety device which has been described above and characterized in that the thrust on the member controlling the opening of the valve of the cylinder is effected through the intermediary of a deformable diaphragm, one face of which is subjected to the action of a spring while the other face is subjected to the utilization pressure of the receiving apparatus, so that when the utilization pressure exceeds the force of the previously compressed spring, the diaphragm is brough back to it initial position and causes the closure of the valve of the cylinder.

In accordance with a simplified and therefore advantageous form of embodiment of the invention, the opening of the valve of the gas cylinder is effected by a thrust applied to the bottom of this cylinder which has the effect of pushing back the extremity of the valve against a fixed abutment, and the closure of the valve is effected by the backward movement of the cylinder permitting the return of the valve to its initial position, the said backward movement taking place when the pressure in the chamber of the utilizing apparatus applies on the head of the cylinder a force greater than that developed by the thrust applied to its bottom, this thrust being applied for example by a suitably calibrated spring.

When as a result of an accidental leakage, the pressure in the utilizing apparatus exceeeds the safety pressure, the cylinder moves backward under the action of this pressure and, in spite of the opposing force of the said spring, up to a position at which the chamber of the utilizing apparatus is put into communication with the exterior.

A further object of the present invention is directed by way of example and without limitation, to the adaptation to the case of a spraying apparatus of the pressure-reducing device and the safety device associated therewith, which have been described above.

The invention will be described below with reference to the accompanying drawings, in which:

FIG. 1 is a view in longitudinal section of a pressure-reducing safety device according to the invention, in the closed position of the cylinder.

FIG. 2 shows the same device in the open position of the cylinder.

FIG. 4 is a view in longitudinal section of another form of construction of the pressure-reducing safety device.

FIG. 5 shows the same device after release of the safety system, caused by an abnormal leakage from the valve of the cylinder.

FIG. 6 is a view in longitudinal section of a spraying apparatus to which it fitted a pressure-reducing safety device according to the invention.

FIG. 7 is a cross-section taken along the line $a$—$a$ of FIG. 6.

FIG. 8 is a cross-section taken along the line $b$—$b$ of FIG. 6.

FIG. 9 is a partial view following FIG. 6, showing the pressure-reducing valve in the position at which it supplies the chamber of the spray.

Figure 3:
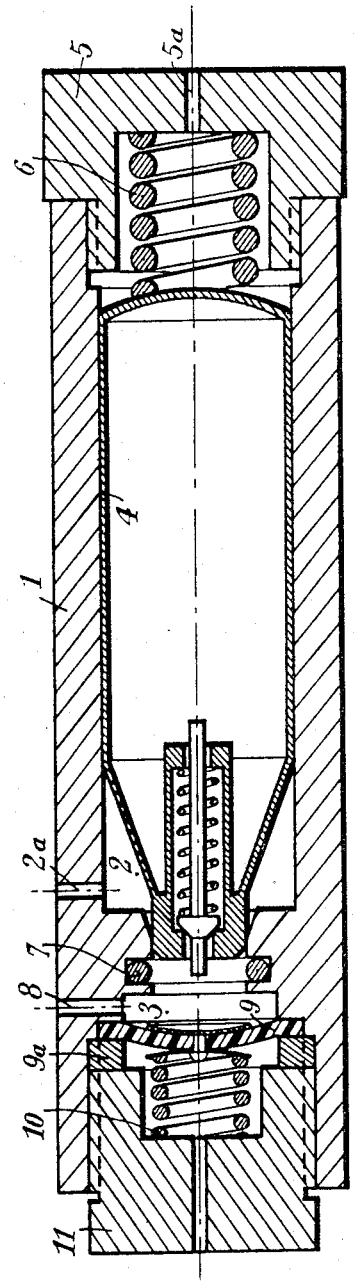
FIG. 3 is a view of the same device after the operation of the safety system.

The device shown in FIGS. 1 to 3 comprises a body 1 in which are formed two chambers 2 and 3. The chamber 2 receives a cartridge 4 of gas under pressure and is closed by a threaded plug 5 provided with an orifice 5a. A spring 6 is housed between the bottom of the cartridge and the plug 5.

The chamber 2 is in communication with the exterior through an orifice 2a.

The neck of the cylinder 4 is engaged in a throttle portion separating the chamber 2 from the chamber 3, and provided with an O-ring seal 7.

The chamber 3 which is in communication with the chamber of the utilizing apparatus through an orifice 8 is closed by a flexible diaphragm 9, at the center of which is supported the extremity of the rod of the valve of the cylinder 4. The diaphragm 9 is held in position by a clamping ring 9a and on its face opposite the rod of the valve is supported a spring 10, the compression of which can be adjusted by means of a threaded knob 11. In the device illustrated, and by way of example, the cylinder 4 is provided with a known control valve of the type described in French Patent No. 1,350,031, and in its first addition No. 82,885, which is essentially constituted by a spring loaded valve stem member as illustrated in FIGS. 1–9.

In order to supply the utilizing apparatus with gas under pressure, it is only necessary to screw the knob 11 until it comes into abutment against the ring 9a.

In this position (see FIG. 2), the spring 10 is compressed, the diaphragm 9 is deformed and the valve of the cylinder leaves its seating, permitting the gas to escape and to supply the utilizing apparatus by passing through the orifice 8.

In view of the very small surface area of the bearing circle of the valve on its seating, the forces generated by the pressures applied on this surface on each side can be neglected. This also applied to the force of the valve spring. The result is that the diaphragm 9 will again take-up its initial position corresponding to the closure of the valve when the following inequality has been checked:

$$F+(S \times A) < S \times Pu$$

where

F is the force of the spring 10;
S is the free surface area of the diaphragm 9;
A is the atmospheric pressure;
Pu is the pressure in the utilizing apparatus.

It can be seen that the pressure in the utilizing apparatus adjusts itself automatically to the desired value, as a function of the appropriate compression which is given to the spring 10.

If leakages take place in the closed position of the valve, the pressure in the utilizing apparatus and in consequence in the chamber 3, increases to a value such that the force which it applies on the section of the neck of the cylinder is equal to the force of the spring 6. When this threshold value is exceeded, the cylinder moves backward, compressing the spring 6, the neck sliding in the O-ring seal 7. The device then assures the position shown in FIG. 3, in which the gas from the chamber 3 can pass into the chamber 2 and escape through the orifice 2a.

It can be seen that the value of the pressure which causes the operation of the safety device will be a function of the strength of the spring 6. This value will obviously be chosen higher than the utilization pressure of the receiving apparatus and less than the pressure which would involve bursting of the chamber of the said apparatus.

The device shown in FIGS. 4 and 5 comprises a body 1 in which is housed a cylinder 4 of compressed gas. The neck of the cylinder can slide inside the O-ring seal 7. A spring 6 supported on a plug 5 pushes the cylinder towards the bottom of the body 1, in which is provided a passage 8 communicating with the chamber 12 of the utilizing apparatus through lateral orifices 13 which are normally closed by a cylindrical sleeve 14 of elastic material.

When the cylinder is introduced into the body 1 and the plug 5 is screwed fully home, the point of the valve of the cylinder comes into abutment with the face 15 and the valve is pushed back to the open position, thus liberating the gas which flows out through the passage 8 towards the chamber 12, after having lifted the elastic sleeve 14.

The pressure existing in the chamber 12, in the passage 8 and in the bottom of the body 1, applies on the front face of the cylinder a force in opposition to the force of the spring 6.

When this force exceeds that of the spring 6, the cylinder 4 moves backward, its neck sliding in the O-ring seal 7. This backward movement continues until the valve has re-closed completely, thus stopping the flow of gas.

If the pressure in the utilizing apparatus diminishes, the spring 6 pushes the cylinder back into the bottom of the body 1, the valve is again pushed back and the gas from the cylinder passes out to the utilizing apparatus.

It can thus be seen that the device according to the invention makes it possible to maintain in the utilizing apparatus, a given pressure which is a function of the force of the spring 6.

If in consequence of a leakage in the valve, the gas escapes from the cylinder although the valve is closed, the pressure of the expanded gas increases. This increase in pressure causes an increase in the compression of the spring 6 and a backward movement of the cylinder which continues up to the moment when the neck of the cylinder is free of the O-ring seal 7. The gas then escapes through an orifice 16 formed in the body 1, which has the effect of limiting the pressure of utilization to the desired value.

The elastic sleeve 14 which covers the orifices 13 makes it possible to remove a cylinder and to replace it without the gas enclosed in the apparatus 12 being able to escape during the operation.

It can be seen that in this advantageous form of embodiment of the invention, the same spring takes part in the operation of the pressure-reducing device and in that of the safety device, depending on whether it is more or less compressed respectively by the safety pressure or by the utilization pressure.

FIGS. 6 to 9 relate to a spraying apparatus equipped with a pressure-reducing safety device according to the invention, this device having however been adapted, as can be seen, so that it occupies on the one hand the smallest possible space and, on the other hand, so that the spray has an attractive appearance.

The spray apparatus comprises a body 17 provided with an atomizer head 18 and a neck 19 fitted with a plug 20.

The base of the body 17 is extended by a skirt 17a and on its bottom 17b is mounted an internal sleeve 21 closed at its top by a diaphragm 22 covered with a cap 23 which has a tubular outlet 23a on which is connected an admission pipe 23b curved back with a bend. The extremity of the pipe 23b is closed but is provided with holes 13 which are covered by a sleeve 14 of elastic material.

On its inner face, the cap 23 is provided at its center with a pin 24, the extremity of which passes through the diaphragm 22 by a passage formed in this latter.

On the edges of this passage is inset a socket 25 arranged in the sleeve 21.

The base of the socket 25 is closed by a threaded plug 26 provided with a shoulder 26a. The plug 26 is capped by a sliding sheath 27 retained by a keeper-ring 28 supported by the shoulder 26a. Between the shoulder 26a and the bottom of the sheath 27 is arranged a spring 29. The shoulder 26a is splined, as shown in FIG. 7. Thus, the sheath 27 can only slide on the plug 26 and any rotation about the plug is prevented.

This same arrangement is again provided between a splined shoulder 25a of the socket 25 and the walls 21a of the sleeve 21, also splined at this point, as shown in FIG. 8.

The hood formed by the plug 26 and the sheat 27 having been unscrewed, there is introduced into the socket 25 a cylinder 4 of compressed gas, the neck of which is housed in the narrowed upper portion of the socket, fluid-tightness being ensured by O-ring seal 7.

The hood is then screwed onto socket 25 again, a spring 6 fixed to the bottom of the plug 26 then applying its force against the bottom of the cylinder 4.

In order to supply the chamber of the spray with gas and to establish in it the appropriate utilization pressure, it is only necessary to apply force to the base of the apparatus.

This action has the effect of causing the sheath 27 to slide over the plug 26 until its upper edge comes into abutment against the lower face of the bottom 17b (see FIG. 9). The upwaard movement of the sheath 27 causes a certain compression of the spring 29, which consequently applies a thrust on the plug 26 and then on the socket 25. This assembly then moves upwards, which results in a deformation of the diaphragm 22 (FIG. 9). In this top position, it can be seen that the control rod of the valve of the cylinder 4 comes into abutment against the extremity of the pin 24, which causes a backward movement of the rod, the opening of the valve and the escape of the gas under pressure through the pipe 23b and the orifices 13, into the space located above the liquid to be vaporized, after lifting the elastic sleeve 14.

When the pressure of the gas in this space has reached a utilization value suitable for the correct operation of the spray, the pressure applied on the upper face of the diaphragm 22 overcomes the resistance of the spring 29 which is then compressed a little more, while the assembly formed by the socket 25, the diaphragm 22 and the cylinder 4 goes back to its initial position in which the flow of gas is stopped, the valve being no longer acted upon by the pin 24.

In accordance with what has already been stated above, it is quite clear that the utilization pressure thus automatically established in the chamber of the spray, is a function of the resistance to compression offered by the spring 29 in the compressed position which it occupies after the sheath 27 has been displaced through the distance h (see FIG. 6).

The operation which has just been described is very rapid. In fact, it is only necessary to press the apparatus on its base for a very short moment in order to effect the re-charge of the spray to the predetermined pressure of use.

This operation may be repeated whenever the need for it becomes apparent, until the cylinder of compressed gas at high pressure is exhausted.

In accordance with an alternative form, the sheath 27 controlling the compression of the spring 29 may be provided with a locking device.

The pressure-reducing valve of the spray which has just been described is equipped with the safety device which has been described above. In fact, if leakages take place while the cylinder is closed, the pressure thus generated in the chamber of the spray cannot exceed the pre-established safety value for which the force applied by this pressure on the section of the neck of the cylinder exceeds the force of the spring 6 and causes, in the manner which has already been described above, a backward movement of the cylinder out of the fluid-tight grip of the O-ring seal 7, resulting in the chamber of the spray being put into communication with the exterior, and the automatic limitation to the safety pressure of the gas contained in this chamber.

By virtue of the elastic sleeve 14 which covers the orifices 13 of the extremity of the admission pipe 23b, the gas under pressure can escape into the chamber of the spray, but if this latter is overturned or turned upside down, the liquid which it contains cannot pass into the admission pipe, which would give rise to undesirable leakage.

What I claim is:

1. An apparatus utilizing gas at low pressure supplied from a cylinder of gas under pressure, comprising: a chamber in which the gas under low pressure is stored; a housing contiguous with said chamber; an elastic diaphragm separating said housing from said chamber; a hole in the center of said diaphragm; a receptacle in said housing and adapted to receive a cylinder of compressed gas having valve means, a spring arranged between the bottom of said cylinder and the bottom of said receptacle, an orifice in said receptacle in which is engaged a neck of the cylinder, sealing means interposed between said neck and the wall of said orifice, a fixed abutment disposed opposite said orifice; a sheath externally surrounds the bottom of said receptacle and projecting out of said housing, a compression spring interposed between the sheath and the bottom of said receptacle, the sheath being adapted to slide on said bottom over a predetermined distance and to cause compression of said spring, resulting in the displacement of said receptacle by deformation of said diaphragm, said fixed abutment then opening the valve means of the cylinder to allow the flow of gas therefrom.

2. A safety device for the supply of compressed gas to gas utilization apparatus from a cylinder of compressed gas having a neck with a valve means therein, said device comprising a hollow receptacle adapted for receiving a cylinder of compressed gas for sliding movement, said receptacle having opposite ends, spring means at one of said ends for applying force to the bottom of the cylinder, said receptacle having a chamber at the other end thereof and including a portion for slidably receiving the neck of the cylinder, said receptacle having an opening which is in communication with the chamber and is adapted for supplying compressed gas from the cylinder to the gas utilization apparatus when the valve means of the cylinder is opened, said portion of said receptacle having an annular groove, annular sealing means in the groove for providing a seal between the receptacle and the neck of the cylinder to isolate said opening and the interior of the receptacle below said sealing means, said receptacle having an opening providing communication between the interior of the receptacle below the sealing means and the ambient atmosphere, and means coupled to the receptacle and having an operative position for opening the valve means in the neck of the cylinder, the latter means being inoperative during periods in which compressed gas in not supplied to the gas utilization means, said cylinder being displaceable during such time, under the action of excess pressure in the chamber exceeding the strength of the spring means, to free the sealing means and the neck of the cylinder and establish communication between the chamber and the opening below the sealing means whereby gas can escape and the pressure in the chamber will be reduced.

3. A safety device as claimed in claim 2, wherein said means for opening the valve means comprises means adjustably coupled to the receptacle for controlling the force with which the spring means acts on the cylinder for displacing the latter, said receptacle having a flat surface bounding said chamber for opening the valve means of the cylinder when the latter is displaced by the spring means.

References Cited by the Examiner
UNITED STATES PATENTS

| 2,701,886 | 2/1955 | Ivie | 222—5 X |
| 3,032,788 | 5/1962 | Lowther | 222—5 X |
| 3,127,059 | 3/1964 | Lawrence et al. | 222—52 X |
| 3,161,324 | 12/1964 | O'Neill | 222—52 |

FOREIGN PATENTS 655,503  7/1951  Great Britain.

ROBERT B. REEVES, Primary Examiner.

LOUIS J. DEMBO, Examiner.

N. L. STACK, Assistant Examiner.